March 3, 1964 W. GREGOR 3,123,014
FLUID-MACHINE WITH AXIAL PISTON-CYLINDER ARRANGEMENT
Filed April 20, 1962

Inventor:
WILHELM GREGOR
By Toulmin & Toulmin
Attorneys

United States Patent Office 3,123,014
Patented Mar. 3, 1964

3,123,014
FLUID-MACHINE WITH AXIAL PISTON-CYLINDER ARRANGEMENT
Wilhelm Gregor, Hamburg-Hausbruch, Germany, assignor to Licentia Patent-Verwaltungs-G.m.b.H., Frankfurt am Main, Germany
Filed Apr. 20, 1962, Ser. No. 189,047
4 Claims. (Cl. 103—162)

The present invention relates to a fluid motor or pump i.e. a machine in which the axial movement of pistons in cylinders caused by a pressurized fluid is converted into rotary movement or vice versa.

Machines of this type are known as usually comprise a base member, a rotary shaft, a pivotable barrel or the like receiving an annularly disposed piston-cylinder arrangement.

In machines of this type, the support of each cylinder and of each piston presents specific problems since each cylinder piston arrangement must be supported so as to be capable of tilting of its axis. Also, the cylinder, for example, must be supported to withstand axial forces such as the suction when the piston is withdrawn from the cylinder. Furthermore, there is to be considered a torque transfer from each cylinder upon its supporting member.

It is a primary object of the present invention to improve the cylinder support and the torque transfer in fluid-operated machines having a plurality of cylinders annularly arranged about an axis which can be pivoted and tilted with respect to the main driving or driven shaft.

It is another object of the present invention to improve the cylinder support and to decrease the dimensions in a fluid pump or motor.

According to one aspect of the present invention in a preferred embodiment thereof, it is suggested to provide the following cylinder supporting arrangement. There is first a barrel, tiltable relative to the main driving or driven shaft and drivingly receiving a cylinder support element comprising of a tubular element with a swash-plate type flange having an axially directed bearing surface, axially being understood as referring to the axis of rotation of the cylinder carrier, which axis is tiltable to the main rotational axis as stated. The bearing surface is provided with a plurality of recesses. A plurality of cylinders receiving pistons are arranged annularly around the carrier axis. Each cylinder is closed on the end opposite that receiving the respective piston, by a plug having a radially protruding collar and an axially protruding calotte surface received by a recess in the bearing surface, mentioned above. A resilient annulus is centrally disposed on the cylinder carrier and there are means provided for axially supporting this annulus. The resilient annulus is provided eccentrically with a plurality of regularly spaced bores, with the bores respectively receiving snugly the cylinders. A front face of the resilient annulus engages the cylinder collars, and due to a pretensioning of the annulus, the collars with calottes are urged towards and into the recesses of the bearing surface.

The annulus is preferably made of rubber as used in shock-mounts, and the axial support thereof on the carrier is provided by a plate having a high degree of stiffness.

While the specification concludes with claims particularly pointing out and distinctly claiming the subject matter which is regarded as the invention, it is believed that the invention, the objects of the invention and further objects and advantages thereof will be better understood from the following description taken in connection with the accompanying drawings in which:

Figure 1:
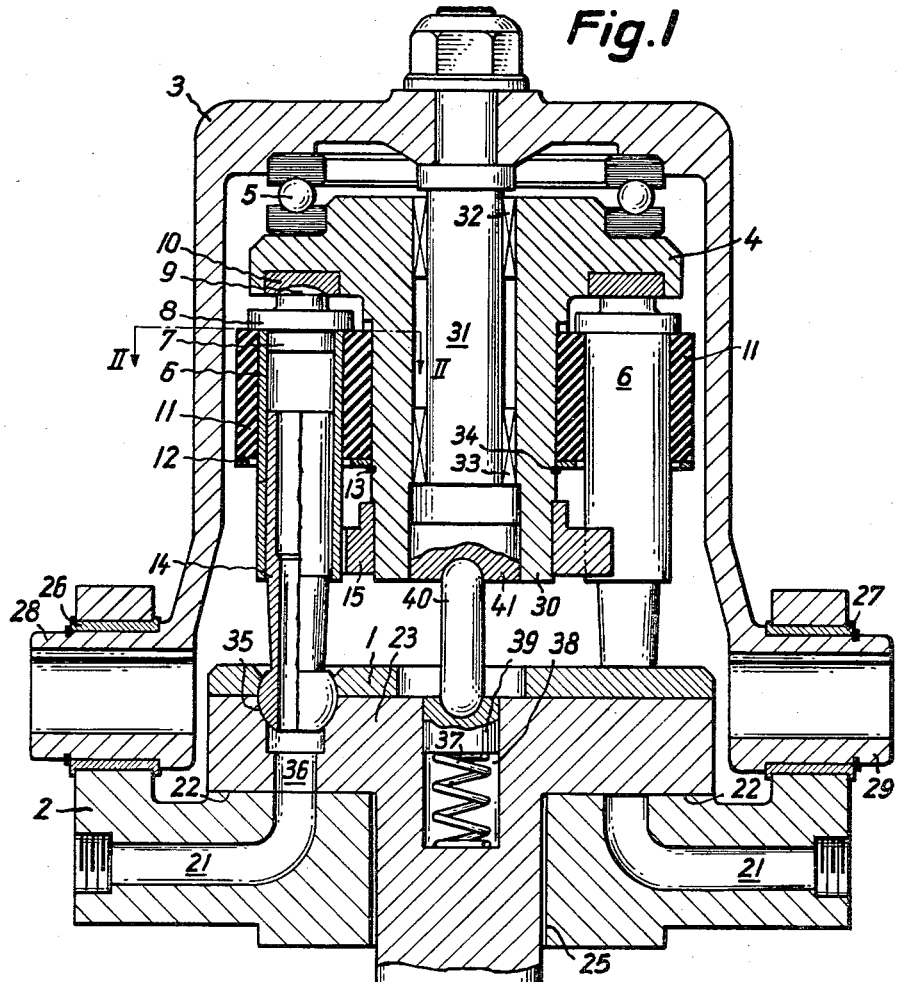
FIG. 1 is a cross-sectional view, partially with broken open sections of a fluid machine in accordance with the present invention.
Figure 2:
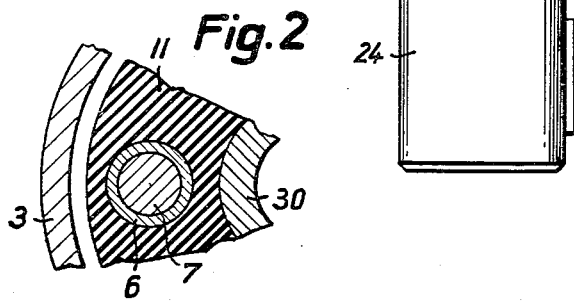
FIG. 2 is a sectional view at II—II of FIG. 1.

In FIG. 1, there is first shown a stationary base member 2 having driving-fluid feeding and discharge channels 21 individually terminating at a flat control surface 22 extending horizontally. In direct sliding engagement with surface 22 there is provided a lower surface of a flange 23 being integral with a driving shaft 24 (provided the device operates as pump, if operated as motor, it is the driven shaft). Flange 23 supports a driving flange 1 being secured to the upper surface of flange 23 and rotating therewith.

Base member 2 has a bore 25 receiving shaft 24. There is sufficient clearance between the walls of bore 25 and shaft 24 to ensure unimpaired rotation. Base member 2 also is provided with two bearings 26 and 27 for rotatably supporting pivot pins 28 and 29, respectively. Pivot pins 28 and 29 pertain to a barrel 3 tiltable about the axis as defined by the two coaxial pivot pins 28 and 29, which tilting occurs in a plane perpendicular to the plane of the drawing, accordingly.

The inner bottom surface of barrel 3 is provided with a ball bearing 5, rotatably supporting a swash plate 4 which is integral with a tubular member 30 receiving a guide pin 31 secured to the bottom of barrel 3, centrally with respect to ball bearing 5. Integral elements 4 and 30 constitute a cylinder carrier. There are rotating bearings 32 and 33 interposed between pin 31 and tubular member 30, since pin 31 does not follow the rotation of shaft 24, but the cylinder carrier does.

There is a spring 37 provided in a central bore 38 of shaft 24, urging against an axially slidable member 39 which has a calotte shaped recess, receiving the semi-spherically shaped end of a retainer and biasing bolt 40, passing through a central bore of flange 1. The other end of retainer bolt 40 is likewise of semi-spherical shape, and this latter end is received in a calotte shaped recess of a member 41 which is secured to element 30. Thus, spring 37 urges plate 4 against the bearing 5 via elements 39, 40, 41 and 30.

There is provided a plurality of (usually an uneven number) cylinders 6, each being open on its downwardly directed top.

The bottom of each cylinder 6 is closed by a plug member 7 secured to cylinder 6 by welding or the like, and having a collar 8 as well as a protrusion with a calotte shaped surface 9.

The lower surface of swash plate 4 is provided with an annulus 10 of hardened steel (10). This element 10 may also be integral with plate 4 and constitute a particularly hardened annular portion thereof. There is no requirement, that there be a definite border between portion 10 and plate 4.

Annulus 10 has calotte shaped recesses respectively receiving the surfaces 9 and being centered therein.

These thus provided bearings for the cylinders receive the centrifugal forces occurring at cylinders 6 when the machine is running.

All cylinders are snugly received by a ring-shaped member or annulus 11 having eccentrically provided a number of bores, the number being similar to that of the cylinders.

The ring shaped member of annulus 11 is made of resilient material such as rubber used as shock-mount, and this annulus 11 engages with one of its axial surfaces or front faces, the collar 8 of each cylinder-plug 7. The opposite side or face of annulus 11, i.e. approximately the entire surface thereof engages a ring shaped plate 12 having eccentrically located bores passed through by the cylinder 6, respectively. Ring 12 is very stiff and offers considerable resistance against bending.

A ring support 13 is received in a groove 34 of tubular member 30, and plate 12 is seated so as to rest against ring 13. Ring 13 may be wedged or clamped into groove 34.

Groove 34 has such a predetermined and premanufactured axial distance from the downwardly directed bearing face of annulus 10, that the resilient member 11 is kept under tension as between plate 12 and collars 8, so that in turn ring member 11 urges the calottes 9 against and into the matching bearing calotte recesses of annulus 10.

Since the calotte type bearings, thus defined by elements 9—10, receives the centrifugal forces, ring member 11 does not have to be dimensioned and designed for that purpose.

Each cylinder 6 receives a hollow piston 14 having a ball-and-socket joint 35 as connection for support by flange 1. The ball and socket joints are provided with a channel, with each channel communicating with an inlet bore 36 in flange 23, which bores may individually register with any of the channels 21 at control surface 22 upon rotation of shaft 24. The rotary motion of shaft 24, of flange 1, and of pistons 14, as well as the torque thereof is transmitted upon cylinders 6, engaging a star-shaped or tooth-wheel shaped element 15, which is secured to tubular member 30 of the cylinder carrier. The torque transfer from the cylinders to the cylinder carrier as defined by integral elements 4 and 30, is carried out by the surfaces of the eccentrically disposed bores in ring member or annulus 11 and by star wheel 15, and all the axial surfaces thereof respectively positively engage a considerable outer surface portion of each cylinder 6.

In operation, barrel 3 is pivoted, for example by 0.5° about pins 28 and 29. Accordingly, the cylinders 6 oscillate axially and pivot by also ±0.5° about the center of their calotte 9. The tensioning action of resilient annulus or ring member 11 ensures, that cylinder 6 with plug 7 and calottes 9 are not lifted from the annulus 10 whenever the respective piston 14 is pulled out of its enveloping cylinder. Thus, constant positive and biased engagement of each cylinder 6 with swash plate 4 prevents damage and noise. Due to pumping of the several cylinder-piston arrangements, of course, pumping fluid flows through the channel 21—21. Of course, the device can also operate as fluid motor in which case a fluid under different pressures in the two channels 21 causes a rotatory driving of shaft 24.

This application is a continuation-in-part application of application Serial No. 822,363, filed June 23, 1959.

The invention is not limited to the embodiments described above but all changes and modifications thereof not constituting departures from the spirit and scope of the inventions are intended to be covered by the following claims.

I claim:

1. Fluid machine comprising: a stationary base member having a bore and a flat control surface with fluid inlet and outlet apertures; a shaft received in and cleared by said bore of said base member and having a flange, a flat surface of which engaging said control surface, said flange having annularly disposed bores; a plurality of hollow pistons tiltably mounted on said flange respectively in communication with said bores thereof, said bores being capable of registering and communicating successively with said inlet and outlet upon rotation of said shaft; a plurality of cylinders, respectively receiving said pistons, each cylinder having a bottom portion provided with a collar having a calotte shaped bearing surface; a barrel tiltably mounted on said base member having its axis of tilting extending perpendicularly to the axis of said shaft; a cylinder-supporting member drivingly supported in said barrel and having a swash-plate type flange; means defining calotte shaped recesses on said swash plate type flange, each recess recieving a calotte shaped bearing surface of said cylinders; means on said cylinder supporting member defining an axial supporting surface; and a pretensioned, resilient member interposed between said last mentioned supporting means and each of said collars for urging the calotte shaped surface portion of each cylinder against the respectively calotte shaped recesses in said swash plate.

2. Fluid machine comprising: a stationary base member having a bore and a flat control surface with fluid inlet and outlet; a shaft received in and cleared by said bore of said base member and having a flange, a flat surface of which engaging said control surface; a plurality of hollow pistons tiltably mounted on said flange, there being channels in said flange respectively communicating with said pistons and terminating at the flange surface engaging said control surface, said channels capable of successively and individually registering with said inlet and said outlet upon rotation of said shaft; a plurality of cylinders, respectively receiving said pistons, a plug member with radially protruding collar for each cylinder, and closing it opposite of the piston therein; means on each plug member defining a calotte shaped bearing surface; a barrel tiltably mounted on said base member having its axis of tilting extending perpendicularly to the axis of said shaft; a cylinder-supporting member drivingly supported in said barrel and having a swash-plate type flange; means defining a plurality of calotte shaped recesses on said swash plate type flange, each recess individually receiving a calotte shaped bearing surface of said cylinders; a resilient annular member mounted on said cylinder supporting member and having a plurality of eccentrically disposed bores, each one receiving snugly one cylinder and engaging the respective collar thereof, and means on said cylinder supporting member for tensioning said resilient member so as to urge the collar with the calotte shaped surface against the respectively calotte-shaped recesses in said swash plate.

3. Fluid machine comprising: a stationary base member having a bore and a flat control surface with fluid inlet and outlet; a shaft received in and cleared by said bore of said base member and having a flange, a flat surface of which engaging said control surface; a plurality of hollow pistons tiltably mounted on said flange, there being channels in said flange respectively communicating with said pistons and terminating at the flange surface engaging said control surface, said channels being capable of individually registering with said inlet and outlet upon rotation of said shaft; a plurality of cylinders, respectively receiving said piston, each cylinder having a bottom portion provided with an annularly, sidewardly protruding collar having a calotte shaped bearing surface; a barrel tiltably mounted on said base member having its axis of tilting extending perpendicularly to the axis of said shaft; a cylinder-supporting member rotatably supported in said barrel and having a swash-plate type flange; means defining calotte shaped recesses on said swash plate, each recess individually receiving a calotte shaped bearing surface of said cylinders; a ring shaped plate, with eccentrically positioned openings and being made of stiff material and being seated on said cylinder supporting member axially spaced from said swash plate, said cylinders respectively passing through said openings; and a pretensioned resilient member mounted on said ring shaped plate, and having bores aligned with the openings thereof and snugly receiving said cylinders and urging the collars with bearing surface against said recesses in said swash plate, respectively.

4. In a fluid machine of the character described, a cylinder with cylinder mount, comprising: a tubular member with a swash plate integral therewith, said plate having an axially directed hardened bearing surface and a calotte shaped recess therein; a second tubular element defining a cylinder, a plug with collar closing the cylinder opposite the side provided for receiving a piston, said collar protruding radially from said cylinder and defining an axially directed surface; means on said collar defining a calotte shaped surface extending axially but opposite said last mentioned collar surface, said calotte shaped surface being received by said recess in said hardened bearing surface; a resilient member snugly receiving said cylinder and engaging said axially directed collar surface; and means on said first tubular element engaging said resilient member and pretensioning it in axial direction so that said collar with calotte surface is urged against said recess in said swash plate.

References Cited in the file of this patent
UNITED STATES PATENTS

| | | |
|---|---|---|
| 2,240,121 | Patterson | Apr. 29, 1941 |

FOREIGN PATENTS

| | | |
|---|---|---|
| 1,108,567 | Germany | June 8, 1961 |
| 880,132 | Great Britain | Oct. 18, 1961 |